(12) United States Patent
Farrell

(10) Patent No.: US 12,509,194 B1
(45) Date of Patent: Dec. 30, 2025

(54) SYSTEMS AND METHODS FOR DETERMINING UTILIZATION ACCESSORIES FOR A MARINE VESSEL

(71) Applicant: Brunswick Corporation, Mettawa, IL (US)

(72) Inventor: Kevin T. Farrell, Port Orange, FL (US)

(73) Assignee: Brunswick Corporation, Mettawa, IL (US)

( * ) Notice: Subject to any disclaimer, the term of this patent is extended or adjusted under 35 U.S.C. 154(b) by 154 days.

(21) Appl. No.: 18/461,216

(22) Filed: Sep. 5, 2023

(51) Int. Cl.
*B63B 59/02* (2006.01)
*B63B 49/00* (2006.01)
*B63B 79/10* (2020.01)
*B63B 79/40* (2020.01)
*G05D 1/00* (2024.01)

(52) U.S. Cl.
CPC .............. *B63B 59/02* (2013.01); *B63B 49/00* (2013.01); *B63B 79/10* (2020.01); *B63B 79/40* (2020.01); *G05D 1/0206* (2013.01)

(58) Field of Classification Search
CPC ......... B63B 59/02; B63B 79/40; B63B 79/10; B63B 49/00; G05D 1/0206; E02B 3/26
See application file for complete search history.

(56) References Cited

U.S. PATENT DOCUMENTS

| | | |
|---|---|---|
| 5,074,810 A | 12/1991 | Hobbs et al. |
| 5,110,310 A | 5/1992 | Hobbs |
| 6,415,209 B1 * | 7/2002 | Reimer .............. G05B 23/0272 701/28 |
| 6,583,728 B1 | 6/2003 | Staerzl |
| 7,150,664 B1 | 12/2006 | Uppgard et al. |
| 7,156,709 B1 | 1/2007 | Staerzl et al. |
| 7,255,616 B1 | 8/2007 | Caldwell |
| 7,416,456 B1 | 8/2008 | Gonring et al. |
| 7,467,595 B1 | 12/2008 | Lanyi et al. |
| 9,359,057 B1 | 6/2016 | Andrasko et al. |
| 9,927,520 B1 | 3/2018 | Ward et al. |
| 10,000,268 B1 | 6/2018 | Poirier et al. |
| 10,259,555 B2 | 4/2019 | Ward et al. |
| 10,429,845 B2 | 10/2019 | Arbuckle et al. |
| 2022/0009604 A1 * | 1/2022 | Arditi ..................... B63B 59/02 |
| 2022/0009605 A1 * | 1/2022 | Ledden .................. H02J 3/003 |
| 2023/0406465 A1 * | 12/2023 | Ono .................... F02D 41/0002 |

* cited by examiner

*Primary Examiner* — Aaron L Troost
(74) *Attorney, Agent, or Firm* — Andrus Intellectual Property Law, LLP

(57) ABSTRACT

A system for determining utilization of an accessory for a marine vessel. The system includes an accessory holder coupled to the marine vessel and configured to support the accessory, a sensor configured to detect whether the accessory is coupled to the accessory holder, a display device configured to generate a display, and control system operatively coupled to the sensor and the display device. The control system is configured to determine the utilization of the accessory based on whether the sensor detects that the accessory is coupled to the accessory holder. The control system is further is configured to cause the display device to generate the display to indicate the utilization determined for the accessory.

21 Claims, 9 Drawing Sheets

SYSTEMS AND METHODS FOR DETERMINING UTILIZATION ACCESSORIES FOR A MARINE VESSEL

FIELD

The present disclosure relates to systems related to systems and methods for determining the utilization of accessories for a marine vessel.

BACKGROUND

The following are incorporated herein by reference in entirety.

U.S. Pat. Nos. 5,074,810; 5,110,310; and 5,700,171 disclose automatic speed control systems for boats. In certain embodiments, the speed of the boat is measured and compared to a desired speed set by the operator and the speed of the boat engine is adjusted to minimize the difference between the desired speed and the actual speed. The device further incorporates features allowing incremental adjustment of the desired speed, storage of several of these speeds for future use, and a safety feature causing the system to behave as though it were a conventional manual type if the operator makes a gross change to the setting of a manual throttle lever.

U.S. Pat. No. 9,927,520 discloses a method of detecting a collision of the marine vessel, which includes sensing using distance sensors to determine whether an object is within a predefined distance of a marine vessel, and determining a direction of the object with respect to the marine vessel. The method further includes receiving a propulsion control input at a propulsion control input device, and determining whether execution of the propulsion control input will result in any portion of the marine vessel moving toward the object. A collision warning is then generated.

U.S. Pat. No. 10,259,555 discloses a method for controlling movement of a marine vessel near an object, which includes accepting a signal representing a desired movement of the marine vessel from a joystick. A sensor senses a shortest distance between the object and the marine vessel and a direction of the object with respect to the marine vessel. A controller compares the desired movement of the marine vessel with the shortest distance and the direction. Based on the comparison, the controller selects whether to command the marine propulsion system to generate thrust to achieve the desired movement, or alternatively whether to command the marine propulsion system to generate thrust to achieve a modified movement that ensures the marine vessel maintains at least a predetermined range from the object. The marine propulsion system then generates thrust to achieve the desired movement or the modified movement, as commanded.

U.S. Pat. No. 10,429,845 discloses a method for controlling a position of the marine vessel near a target location, which includes measuring a present location of the marine vessel, and based on the vessel's present location, determining if the marine vessel is within a predetermined range of the target location. The method includes determining marine vessel movements that are required to translate the marine vessel from the present location to the target location. In response to the marine vessel being within the predetermined range of the target location, the method includes automatically controlling the propulsion system to produce components of the required marine vessel movements one degree of freedom at a time during a given iteration of control.

SUMMARY

This Summary is provided to introduce a selection of concepts that are further described herein below in the Detailed Description. This Summary is not intended to identify key or essential features of the claimed subject matter, nor is it intended to be used as an aid in limiting scope of the claimed subject matter.

One aspect according to the present disclosure generally relates to a system for determining utilization of an accessory for a marine vessel is disclosed. The system includes an accessory holder coupled to the marine vessel and configured to support the accessory, a sensor configured to detect whether the accessory is coupled to the accessory holder, a display device configured to generate a display, and control system operatively coupled to the sensor and the display device. The control system is configured to determine the utilization of the accessory based on whether the sensor detects that the accessory is coupled to the accessory holder. The control system is further is configured to cause the display device to generate the display to indicate the utilization determined for the accessory.

In certain examples, the control device is configured to determine that the accessory is used when the accessory is detected to be coupled to the accessory holder.

In certain examples, the accessory is a fender for protecting the marine vessel and the accessory holder is a fender holder configured for attaching the fender thereto.

In further examples, the fender holder is moveable between a closed position in which the fender is not attachable thereto and an open position in which the fender is attachable thereto. The sensor detects whether the fender holder is in the closed position or the open position, and the fender is detected to be coupled to the fender holder when the fender holder is in the open position.

In further examples, the sensor is a limit switch actuated by moving the fender holder between the open position and the closed position.

In further examples, fender holder moves at least partially into a hull of the marine vessel when moving into the closed position.

In further examples, the control system is further configured to automatically dock the marine vessel, and the control system automatically docking the marine vessel is prevented when the sensor detects that the fender is not coupled to the fender holder so as to prevent damage to the marine vessel.

In further examples, the control system is further configured to automatically dock the marine vessel and to receive a request to automatically dock the marine vessel, and the control system is further configured to generate the display indicating the utilization of the fender when the request to automatically dock the marine vessel is received and the sensor detects that the fender is not coupled to the fender holder so as to prevent damage to the marine vessel.

In further examples, the fender holder comprises a port fender holder and a starboard fender holder coupled on a port side and a starboard side of the marine vessel, respectively. The sensor comprises a port sensor and a starboard sensor configured to detect whether the fender is coupled to the port fender holder and the starboard fender holder, respectively, and the control system is further configured to selectively automatically dock the marine vessel on one of the port side and the starboard side thereof. The control system is further configured to generate the display to indicate that the fender is unused particularly via the starboard fender holder when the marine vessel is automatically docking the marine vessel on the starboard side and the starboard sensor detects that the fender is not coupled to the starboard fender holder so as to prevent damage to the marine vessel.

In further examples, the marine vessel comprises a proximity sensor configured to detects a distance between the marine vessel and an external object, and the control system is configured to compare the distance to a threshold and to change the display generated by the display device to indicate that the fender is unused when the sensor detects that the fender is not coupled to the fender holder and the distance between the marine vessel and the external object is below the threshold to thereby prevent damage to the marine vessel.

In further examples, the fender holder comprises a port fender holder and a starboard fender holder coupled on a port side and a starboard side of the marine vessel, respectively. The sensor comprises a port sensor and a starboard sensor configured to detect whether the fender is coupled to the port fender holder and the starboard fender holder, respectively, and the control system is configured to determine on which one of the port side and the starboard side the external object is located. The control system is configured to cause the display device to indicate when the fender is unused particularly on the one of the port side and the starboard side in which the external object is located so as to prevent damage to the marine vessel.

In further examples, the marine vessel comprises a speed sensor configured to measure a speed in which the marine vessel moves in water, and the control system is configured to cause the display device to change the display of the utilization based at least in part upon the speed of the marine vessel.

In further examples, the control system is configured to change the display of the utilization when the fender is in use and the speed of the marine vessel exceeds a speed threshold.

In further examples, the fender is one of multiple fenders for protecting the marine vessel and the fender holder is one of multiple fender holders coupled to the marine vessel and configured to support multiple fenders, respectively, and the display device is configured to display the utilization of the multiple fenders separately from each other In further examples, the display by the display device comprises a graphic depiction of the marine vessel and the utilization of each of the multiple fenders is displayed in a corresponding different location relative to the depiction of the marine vessel.

In further examples, the sensor is a solid-state sensor that detects a presence of a line coupling the fender to the fender holder.

In further examples, the accessory is a sun canopy assembly configured to provide shade for the marine vessel when in use, and wherein a pole of the sun canopy assembly is couplable to the marine vessel via the accessory holder.

In further examples, the marine vessel comprises a speed sensor configured to measure a speed in which the marine vessel is moving in water, and the control system is configured to cause the display device to change the display of the utilization of the sun canopy when the sun canopy is determined to be in use and the speed of the marine vessel exceeds a first threshold speed.

In further examples, the control system is further configured such that when the sun canopy is determined to be in use, the control system prevents the marine vessel from operating such that the speed exceeds a second threshold speed.

One aspect according to the present disclosure generally relates to a system for detecting use of a first fender and a second fender with a marine vessel is disclosed. The system includes a first fender holder and a second fender holder. The first fender holder is moveable between a closed position that is stowed and an open position configured for supporting the first fender. The second fender holder is moveable between a closed position that is stowed and an open position configured for supporting the second fender. The system includes a first switch configured to detect whether the first fender holder is in the open position and a second switch configured to detect whether the second fender holder is in the open position. The system further includes a display device configured to display the use of the first fender and the use of the second fender, such that the first fender and the second fender are determined to be in use when the first fender holder and the second fender holder are in the open position, respectively.

BRIEF DESCRIPTION OF THE DRAWINGS

Examples are described with reference to the following drawing figures. The same numbers are used throughout to reference like features and components.

DETAILED DESCRIPTION OF THE DRAWINGS

Figure 1:
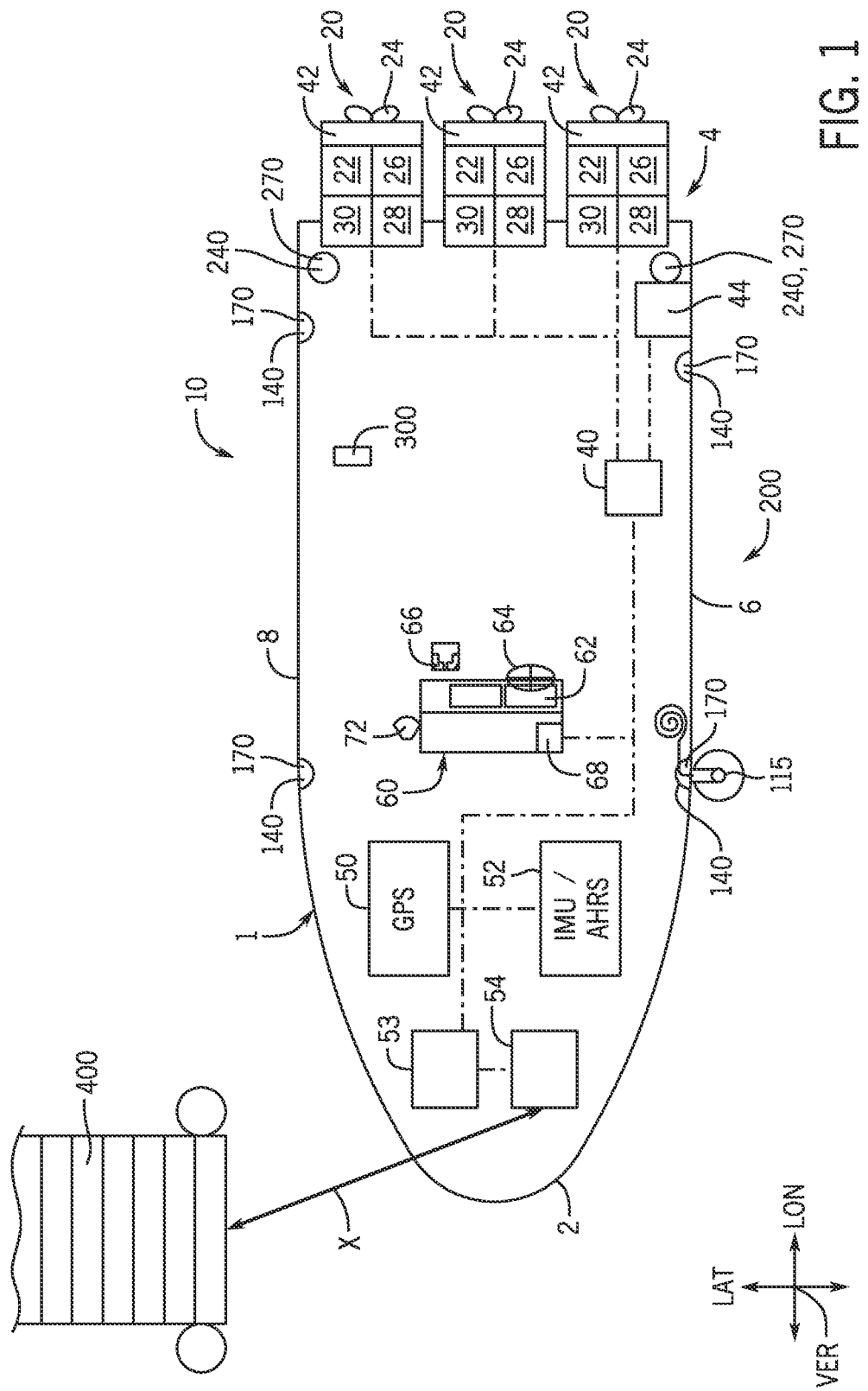
FIG. 1 is a top view of a marine vessel incorporating one embodiment of a system for determining utilization of deployable accessories according to the present disclosure.
Figure 2:
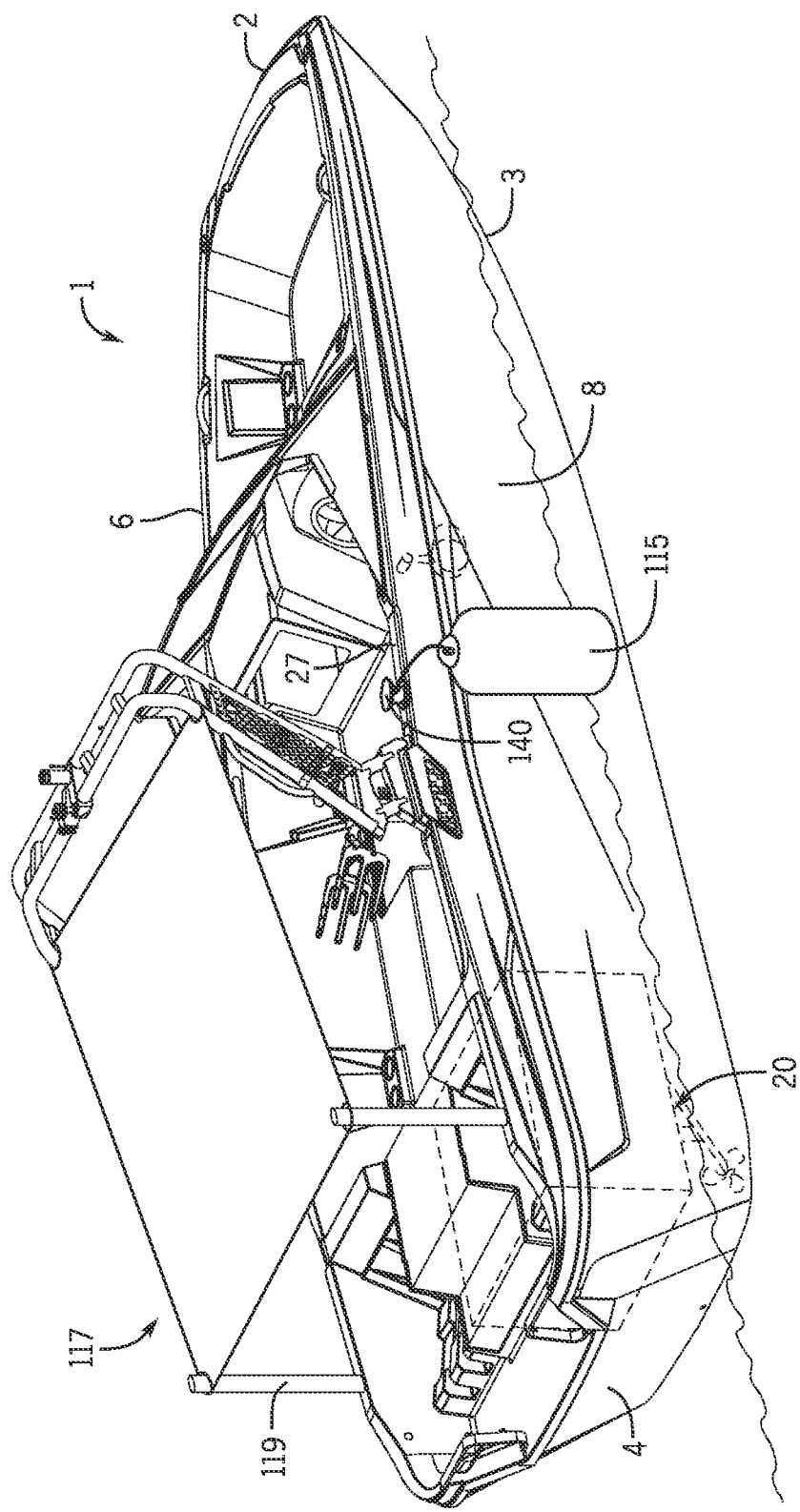
FIG. 2 is a perspective view of the marine vessel having deployable accessories.

FIGS. 1-2 show a marine vessel 1 and a system 10 for determining a utilization state of marine accessories according to the present disclosure. The marine vessel 1 extends between a bow 2 and a stern 4 along a longitudinal axis LON, between a port side 6 and starboard side 8 along a latitudinal axis LAT perpendicular to the longitudinal direction LON, and between a bottom 3 and a gunwale 27 along a vertical axis VER perpendicular to the latitudinal axis LAT and the longitudinal axis LON.

The marine vessel 1 is propelled through the water by a plurality of marine drives 20, which while shown as outboard motors could instead be inboard motors, stern drives, pod drives, and/or jet drives. Each marine drive 20 includes a powerhead 22. The powerheads 22 may be internal combustion engines (e.g., gasoline or diesel engines), electric motors, and/or a hybrid thereof. Each marine drive 20 in FIG. 1 also includes a propeller 24 coupled in torque-transmitting relationship with a respective powerhead 22 so as to generate propulsion in the water. The marine drives 20 further include powerhead speed sensors 26 measuring a speed of a respective powerhead 22 (or an output shaft thereof). In one example, the powerhead speed sensors 26 may be shaft rotational speed sensors (e.g., Hall-Effect sensors), which measure a speed of the powerhead 22 in rotations per minute (RPM) in a manner known in the art.

Each marine drive 20 is further provided with steering actuators 28 configured to steer the marine drives 20, respectively, in accordance with commands from a steering device as discussed further below. The steering actuators 28 may operate as a "steer by wire" system rather than including physical linkages between the marine drives 20 and steering input devices (e.g., a steering wheel). The steering actuators 28 include steering angle sensors therein, which provide feedback regarding the steering angle of the corresponding marine drive 20 in a manner known in the art. The steering actuators 28 may be mechanically, hydraulically, pneumatically, and/or electromechanically operated. Additional information regarding exemplary steering actuators is provided in U.S. Pat. Nos. 7,150,664; 7,255,616; and 7,467,595, which are incorporated by reference herein.

Similarly, each marine drive 20 is provided with a trim actuator 30 configured to adjust the trim angle of these devices in a manner known in the art. The trim actuators 30 include trim angle sensors therein, which provide feedback regarding the trim angle of the corresponding marine drive 20 in a manner known in the art. The trim actuators 30 may be hydraulically, pneumatically, and/or electromechanically operated. Additional information regarding exemplary trim actuators is provided in U.S. Pat. Nos. 6,583,728; 7,156,709; 7,416,456; and 9,359,057, which are incorporated by reference herein.

The marine vessel 1 further includes a helm 60 having a dashboard 70 with a number of operator input devices for controlling various functions of the marine drives 20 and the marine vessel 1 via a control system 100. The operator input devices at the helm 60 include a display device 62 including a user interface, which may be an interactive, touch-capable display screen, a keypad, a display screen and keypad combination, a track ball and display screen combination, and/or any other type of user interface known in the art. The operator input devices further include one or more steering devices, such as a steering wheel 64 and/or a joystick configured to facilitate user input (e.g., via the central control module 40, the propulsion control modules 42, and/or a helm control module 68 in a manner known in the art) for steering the marine vessel 1. A throttle lever 66 is also provided as an operator input device for providing thrust commands. A speaker 72 is provided at the helm for providing audio output to the operator.

With continued reference to FIG. 1, a central control module 40 (or CCM) is provided in signal communication with the powerheads 22, as well as being in signal communication with the associated sensors and other components noted herein below. In certain examples, the central control module 40 communicates with propulsion control modules 42 (or PCMs) and/or other control devices associated with each of the marine drives 20 in a manner known in the art. Although FIG. 1 shows one central control module 40, it will be recognized that more than one central control module may work together serially and/or in parallel, such as one central control module for each of the marine drives 20.

Figure 3:
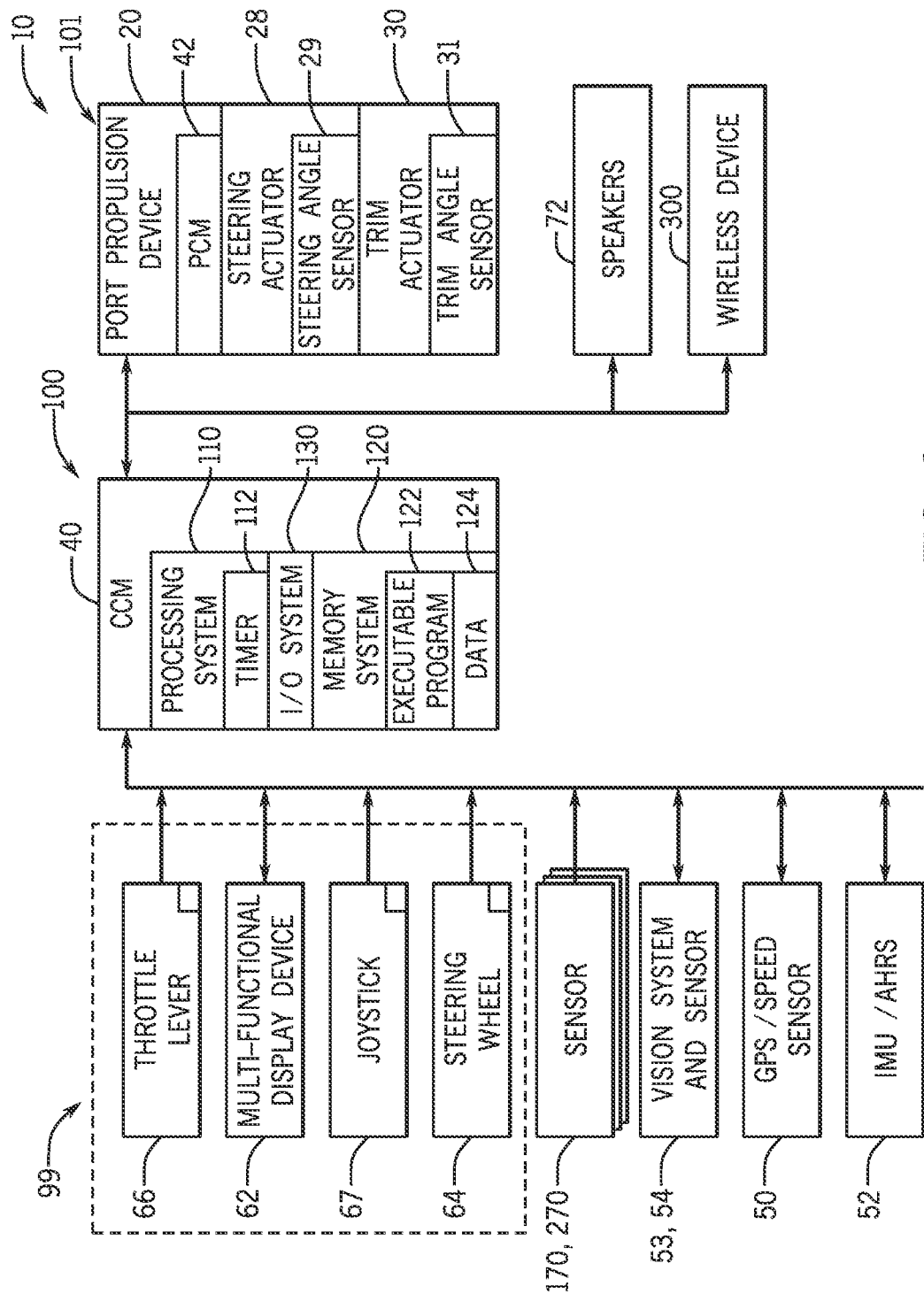
FIG. 3 is schematic view of a control system such as may be incorporated within the marine vessel of FIG. 1.
Figure 4:
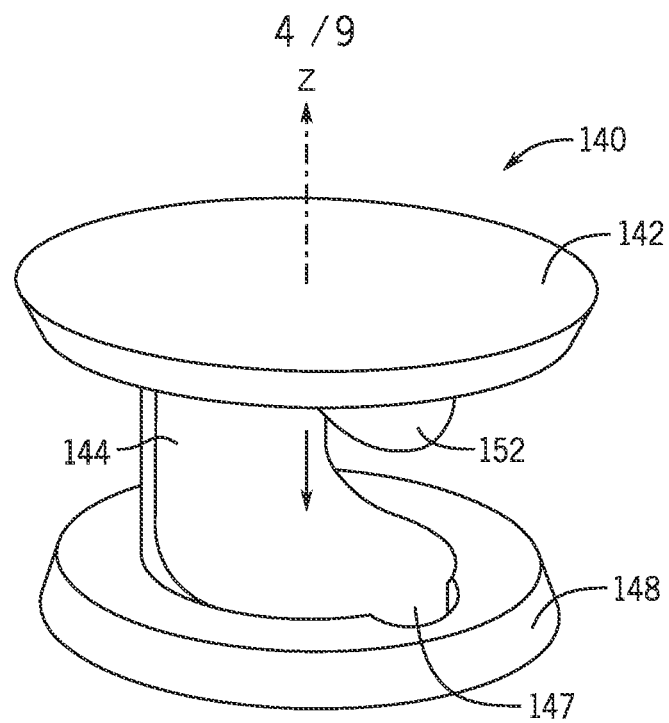
FIG. 4 is a perspective view of a fender holder in an open position.
Figure 5:
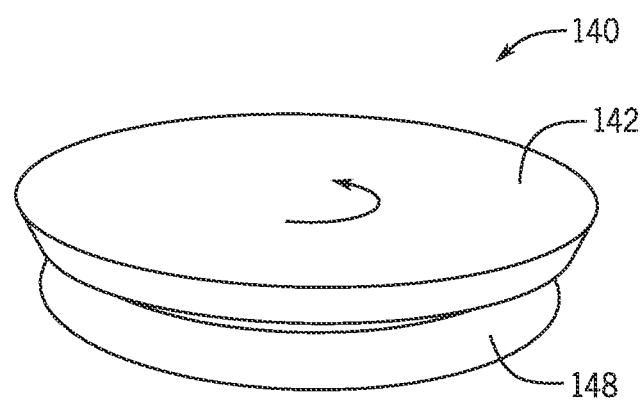
FIG. 5 is a perspective view of the fender holder in a closed position.

Referring to FIG. 3, the central control module 40 includes a memory system 120, which may comprise any storage media readable by the processing system 110 and capable of storing the executable program 122 and/or data 124. An input/output (I/O) system 130 provides communication between the control system 100 and peripheral devices, such as input devices 99 and output devices 101, which are discussed further below. In practice, the processing system 110 loads and executes an executable program 122 from the memory system 120, accesses data 124 stored within the memory system 120, and directs the control system 100 to operate as described in further detail below.

The control system 100 communicates with the input devices 99 which include steering devices, for example the steering wheel 64, and/or a joystick 67, respectively. The control system 100 also communicates with other input devices, such as the display device 62, the GPS 50, the IMU/AHRS 52, sensors 170, and/or proximity sensors 54 of the vision system 53. The control system 100 also communicates with output devices 101 such as the display device 62, propulsion control modules 42, steering actuators 28, and trim actuators 30, for example. It will be recognized that the arrows shown are merely exemplary and that communication may flow in multiple directions. For example, the steering angle sensors 29 and trim angle sensors 31, while shown as corresponding to the steering actuators 28 and trim actuators 30, may serve as input devices 99 feeding into the one or more central command modules 40. In the depicted embodiment, the control system 100 further includes a wireless device 300 which operates as an input device 99 and an output device 101.

The wireless device 300 may be a smartphone or device which allows the operator to input control preferences into the control system 100 or displays information to the operator. The wireless device 300 may communicate wirelessly with the control system 100 using conventional protocols (e.g., Bluetooth®, Wi-Fi, NFC) and corresponding hardware associated with the wireless device 300 and the I/O system 130 of the central control module 40. The wireless device 300 may execute an application stored in onboard memory to configure the wireless device 300 to operate as part of the system 10. The wireless device 300 may be used for providing information to the system 10 in the form of text, verbal command, and/or the like using conventional techniques. For example, the user may provide information relating to the marine accessories, such as positions of accessories throughout the vessel 1, identifying types of accessories being used, and/or other details provided by the user. In addition to serving as an input device 99 to the control system 100, the wireless device 300 may serve as an output device 101. By way of example, a touchscreen display on the wireless device 300 (as is conventional for a smartphone) may be used for displaying various outputs of the system 10. The wireless device 300 may be structured similarly to what is shown for the central control module 40 and in certain embodiments provides some of the functions described therefore.

Power is provided to the marine vessel 1 via a power system 44, which may include batteries and/or other energy storage systems known in the art. The power system 44 provides power to the central control module 40 and propulsion control modules 42, as well as to other components associated with the marine drives 20 or marine vessel 1 more generally, as discussed further below. One such additional component powered by the power system 44 is a global positioning system (GPS) 50 that provides location and speed of the marine vessel 1 to the central control module 40. Examples of other speeds sensors include water wheels and pitot tubes. The marine vessel 1 may also include an inertial measurement unit (IMU) or an attitude and heading reference system (AHRS) (collectively shown as the IMU/ AHRS 52). An IMU has a solid state, rate gyro electronic compass that indicates the vessel heading and solid-state accelerometers and angular rate sensors that sense the vessel's attitude and rate of turn. An AHRS provides 3D orientation of the marine vessel 1 by integrating gyroscopic measurements, accelerometer data, and magnetometer data. The IMU/AHRS 52 could be GPS-enabled, in which case a separate GPS 50 would not be required.

Through experimentation and development, the present inventors have identified problems with respect to a marine vessel operator being required to manage many tasks during takeoff, while underway, and during docking. Specifically with respect to managing the marine accessories, such as fenders and sun canopies, the operator must remember to couple and uncouple accessories according to the docking status, the speed of the vessel, and other factors. The present disclosure generally describes an accessory utilization system or system 10 that determines whether accessories are in a coupled or uncoupled state and assists the operator accordingly, In certain embodiments, the system 10 notifies the operator of the accessory state as well as provides alerts and commands to the user interface and/or central control module if action needs to be taken.

As shown in FIG. 2, the marine vessel 1 is configured for using a variety of these accessories 115, 117, which are attachable to the marine vessel 1 via accessory holders 140, 240. Examples of accessories 115, 117 include but are not limited to fenders, sun canopies, mountable fishing rods, retractable ladders, swim patios, and/or the like. The accessory holders 140, 240 have attached and unattached states or positions depending on whether the accessories 115, 117 are attached or unattached therewith (also referred to as being coupled or uncoupled, engaged or disengaged, used and unused states, etc.). In certain embodiments, the accessory holders 140, 240 are at least partially moveable into and between the attached and unattached states or positions, as discussed further below. The accessory holders 140, 240 are equipped with sensors 170, 270 that detect whether accessories are attached to or otherwise deployed via the accessory holders, which are discussed further below. The sensors 170, 270 are provided in communication with the central control module 40 to serve as inputs devices 99 thereto.

The marine vessel 1 of FIGS. 1 and 2, the gunwale 27 includes examples of accessory holders configured for using a variety of accessories such as fenders, a sun canopy, mountable fishing rods, and/or the like attached thereto. It should be recognized that other locations for accessory holders are also contemplated by the present disclosure, as well as different types of accessory holders for different types of accessories. In the example shown in FIG. 1, the accessory is a fender 115, which is a detachable buoy-like device that is draped over the outside of the hull to protect the marine vessel 1 from contacting a dock 400 or other objects, which may cause damage to the hull and/or the dock 400. During takeoff from the dock 400, the operator can forget to bring the fenders 115 into the marine vessel 1, which commonly causes the fenders 115 to detach and become lost at sea when the vessel 1 approaches higher speeds. In other cases, the operator may forget to deploy the fenders 115 before docking, leaving the hull unprotected and subject to damage.

Referring to FIGS. 4-8, the accessory holder is a fender holder 140, which is movable into and between an open position (FIG. 4) in which the fender 115 is attachable thereto, and a closed position (FIG. 5) in which the fender 115 is not attachable thereto. The fender holder 140 includes a head 142 and a neck 144, which extend through a collar 148 and into a receiving cavity 150 (FIG. 6) that is recessed within the hull. The head 142 is circular and the neck 144 extends downwardly from the center of the head 142, defining a vertical axis Z. The head 142 includes a latch 152 which extends from the vertical axis Z radially outwardly and is configured to engage with the collar 148. The collar 148 extends about the receiving cavity 150. The collar 148 includes a cutout 147 that is sized to allow the latch 152 to pass through when the fender holder 140 is moved into the closed position. The fender holder 140 is rotatable about the vertical axis Z such that the latch 152 can be rotated into and out of alignment with the cutout 147 to retain and release the fender holder 140 from the closed position of FIG. 5. An example of a commercially available fender holder that opens and closes in a similar manner is Pull Up Fender Hook, model number 09120767 produced by IMPORTACIONES NÁUTICAS SA of Spain (also known as IMNASA).

Figure 6:
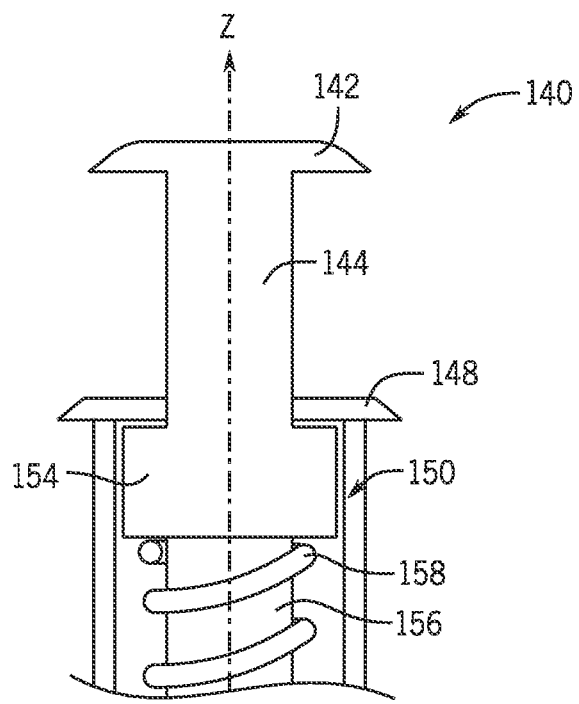
FIG. 6 is a cross-sectional side view of the fender holder in the open position.
Figure 7:
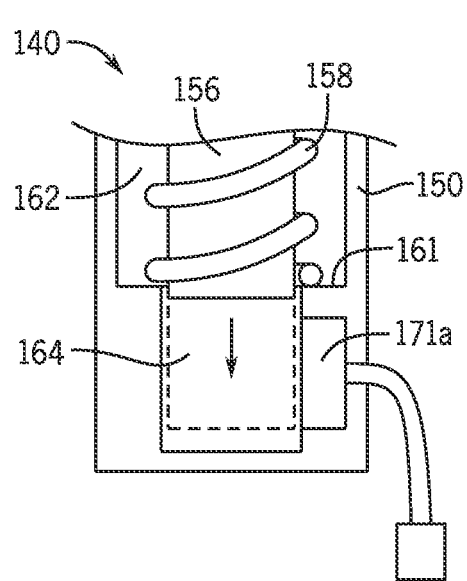
FIG. 7 is a cross-sectional side view of the fender holder in the open position having a first embodiment of a sensor.
Figure 8:
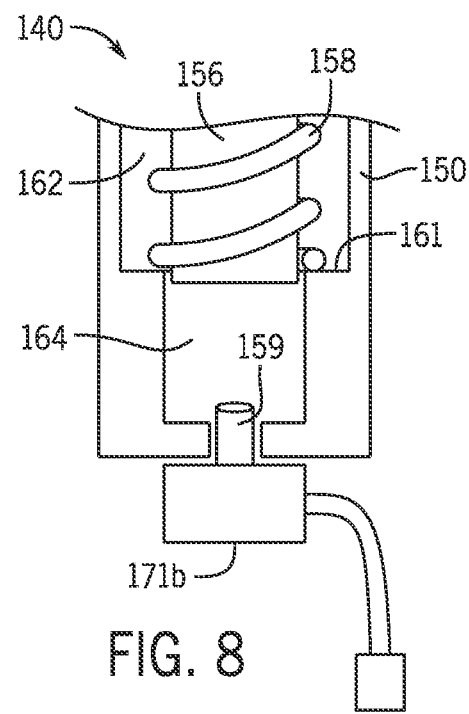
FIG. 8 is a cross-sectional side view of the fender holder in the open position having a second embodiment of a sensor.

Referring to FIGS. 4-8, the accessory holder is a fender holder 140, which is movable into and between an open position. FIGS. 6-8 show the fender holder 140 within the receiving cavity 150. The neck 144 of the fender holder 140 includes a plunger 154 that moves within an interior of the receiving cavity 150. An engagement shaft 156 is also movable with the plunger 154 along the vertical axis Z. In certain embodiments, the head 142, neck 144, plunger 154, and the engagement shaft 156 may be integrally formed, such as of aluminum or an alloy.

As discussed above, the receiving cavity 150 is at least partially recessed into the hull. The receiving cavity 150 includes an internal rim 161 extending inwardly toward the vertical axis Z, dividing the receiving cavity 150 into a first receiving portion 162 and a second receiving portion 164. The second receiving portion 164 has a smaller diameter than that of the first receiving portion 162. A coil spring 158 extends about the engagement shaft 156 so as to be coaxially aligned therewith about the vertical axis Z. The coil spring 158 extends between a first end in contact with the underside of the plunger 154, and a second end in contact with the rim 161 in the receiving cavity 150. The coil spring 158 biases the fender holder 140 toward the open position and is compressed as the engagement shaft 156 is forced downwardly into the second receiving portion 164 when moved into the closed position.

In contrast to fender holders known in the art, the fender holder 140 further includes a sensor 170 that determines a position of the fender holder 140 (i.e., whether the fender holder is in the open or closed positioned). In the two embodiments of sensors 170 shown in FIGS. 7 and 8, the sensors 171a, 171b are positioned within the hull, and specifically within the second receiving portion 164. The sensors 171a, 171b are each operatively coupled to the control system 100 such that the control system 100 is configured to determine the utilization of the fender 115 based on the signal outputs of the sensors 171a, 171b.

FIG. 7 shows a proximity switch 171a such as a Hall-effect sensor positioned within the receiving cavity 150 below the rim 161. In certain embodiments, the proximity switch 171a detects the presence and magnitude of a magnetic field using the Hall effect in a manner known in the art. Inductive sensors may also be used to detect changes in magnetic fields as the fender holder 140 is moved between open and closed positions. It should be recognized that the engagement shaft 156 is only present in the second receiving portion 164, or at least in vertical alignment with the proximity sensor 171a, when the fender holder 140 is in the closer position.

When the proximity sensor 171a detects the engagement shaft 156 within the second receiving portion 164, a signal is sent to the control system 100, which is interpreted to indicate that the fender holder 140 is in the closed state. It follows that if the fender holder 140 is in the closed state, a fender 115 must not be attached since the line for connecting the fender 115 would prevent the fender holder 140 from closing. Likewise, when the proximity sensor 171a detects that the engagement shaft 156 is not within the second receiving portion 164, a signal is sent to the control system 100 that the fender holder 140 is in the open state and the fender 115 is inferred to be coupled thereto. It should be recognized that while the fender holder 140 is described as sending signals both when the fender holder 140 is opened and closed, the presence or absence of a single signal may be used to determine the state.

Other types of sensors may also be positioned in a similar manner as the sensor 171a to provide a signal to the control system 100 in a similar manner. By way of example, this includes a laser or other form of optical sensor that emits a focused light beam that is either blocked or reflected by the engagement shaft 156 to detect the presence of the engagement shaft 156 within the second receiving portion 164. Other examples include capacitance or resistance sensors that detect contact with the engagement shaft 156 when positioned in the second receiving portion 164.

FIG. 8 shows another embodiment of fender holder 140, this time having a push switch as the sensor 171b. In this example, the engagement shaft 156 again moves downwardly in the second receiving portion 164 of the receiving cavity 150. The limit switch sensor 171b is actuated by moving the fender holder 140 between the open position (FIG. 4) and the closed position (FIG. 5), whereby the engagement shaft 156 depresses a plunger 159 of the limit switch sensor 171b. When the limit switch sensor 171b detects the engagement shaft 156 is engaged with the plunger 159, a signal is sent to the control system 100 that the fender holder 140 is in the closed state and that the fender 115 is uncoupled. When the limit switch sensor 171b detects that the engagement shaft 156 is not engaged with the plunger 159, a signal is sent to the control system 100 that the fender holder 140 is in the open state and that the fender 115 is coupled.

Figure 9:
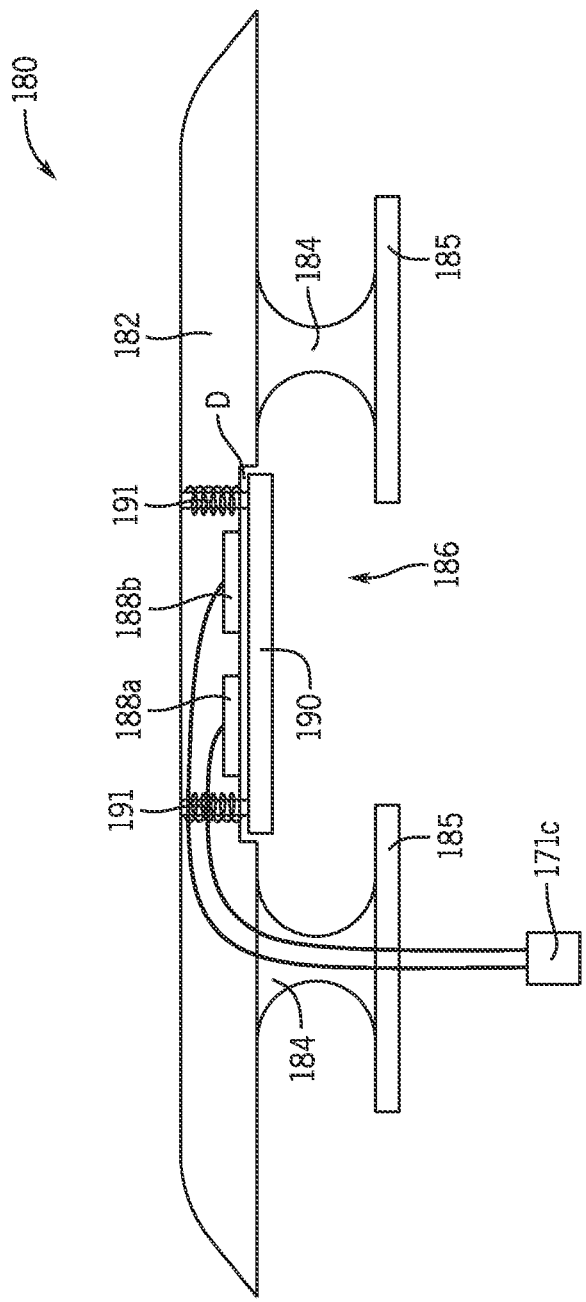
FIG. 9 is a side view of a cleat having a third embodiment of a sensor.

FIG. 9 shows an example of another accessory holder, specifically a cleat 180 according to an alternative embodiment of the present disclosure. The cleat 180 includes a central crossbar 182 that extends along the gunwale between feet 184. The feet 184 are secured to the gunwale via a pair of mounting plates 185. The central crossbar 182 and feet 184 define an opening 186 through which a rope may pass for securing a fender 115 to the vessel 1, or for tying the vessel to a dock or another object. The rope may also or alternately be wound around the outsides of the feet 184 in a conventional manner. However, for simplicity the present example shows a configuration that senses the attachment or non-attachment of an accessory with a rope through the opening 186.

A pair of contacts 188a, 188b are secured to an underside of the central crossbar 182 and an actuation plate 190 is positioned a distance D beneath the contacts 188a, 188b. The actuation plate 190 is biased away from the contacts 188a, 188b by a pair of springs 191. A sensor 171c is positioned within the hull and in wired communication with the contacts 188a, 188b, forming an open circuit 194. When a fender, and anchor, or another object is tied onto the cleat 180 about the central crossbar 182, the rope overcomes the bias of the springs 191 and brings the actuation plate 190 into engagement with the contacts 188a, 188b, thus closing the circuit. The sensor 171c detects that the circuit has been closed and provides a signal to the control system 100 to indicate that the accessory holder is in use.

Other mechanisms for detecting the presence of a line on the cleat 180 are also contemplated by the present disclosure. By way of example, this includes sensors that detect a change in capacitance or resistance when a line contacts the cleat 180, the use of push switches, optical sensors, or other types of switches known in the art.

The present disclosure also contemplates systems and methods for coupling types of accessories to marine vessels and determining the utilization thereof. By way of example, the marine vessel 1 of FIG. 2 shows the use of a sun canopy 117. In this embodiment, the sun canopy 117 is supported at least in part via poles 119 that are attachable to corresponding accessory holders 240 in the hull (FIG. 1). The accessory holders 240 may be the same or similar to those used for coupling flags and/or lights to marine vessels in a manner known in the art, generally comprising receiving cavities such as the receiving cavity 150 shown in FIGS. 6-8. In certain embodiments, a power plug may be provided in the bottom of the receiving cavity 150, which mates with a corresponding connector for the accessory (e.g., a light) such that power is provided for the accessory when the accessory is coupled to the accessory holder 240.

The sun canopy 117 shown is also supported in part by a tower of the marine vessel. However, the status of this accessory being used or unused may be determined by monitoring one or both poles 119 alone. In particular, the system 10 is configured to determine that the sun canopy 117 is in use by detecting that the poles 119 have been inserted in the corresponding accessory holders 240. The sensor 270 corresponding to the accessory holder 240 may determine that a pole 119 is present within the receiving cavity therein using one of the switches described above or others known in the art. By way of example, the receiving cavity of the accessory holder 240 may be configured to have a switch like the proximity switch 171a of FIG. 7 (e.g., being a proximity sensor, an optical sensor, or a capacitance or resistance sensor), the switch 171b of FIG. 8 (e.g., being a push switch), or other types of switches and sensors known in the art. In this case, the control system is configured to respond to signals from the sensors in an opposite manner as the deployable fender holder described above. In particular, the pole 119 being in the receiving cavity corresponds to the accessory being in use, whereas a portion of the fender holder being in the cavity corresponds to the accessory not being in use (since the fender holder cannot close when in use).

The present disclosure also contemplates detecting the utilization of types of accessories, including other types of sun canopy assemblies. For example, the sun canopy may pivot between opened and closed positions rather than having poles be inserted into receiving cavities in the hull. In this case, one of the types of sensors described above may be actuated based on the pivot angle of the sun canopy assembly (e.g., detecting one of the pivoting tubes being against a sensor on the gunwale when folded into the stowed position, see FIG. 11). In other examples, the shade may be electromechanically deployed, such as the PTX Powershade offered by SureShade®, part of Lippert Components of Indiana. In these cases, the position of the shade may be discerned by detecting the position of the actuator that moves the shade between the stowed and deployed positions. For example, the output of an encoder for a linear or rotary actuator may be used to determine whether the sun canopy is in the stowed position or in the deployed position.

In the case of an accessory having an electrical mating with the accessory holder, the accessory holder may detect the presence of the accessory by detecting this mating (e.g., completing an open circuit similar to the embodiment of FIG. 9, magnetic switches, limit switches, or other sensing devices known in the art).

Figure 11:
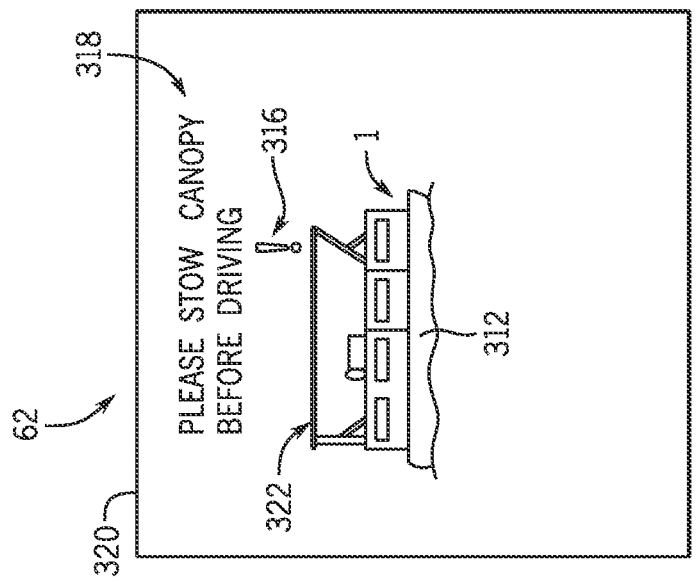
FIG. 11 is an alternative view of the user interface of the marine vessel.
Figure 10:
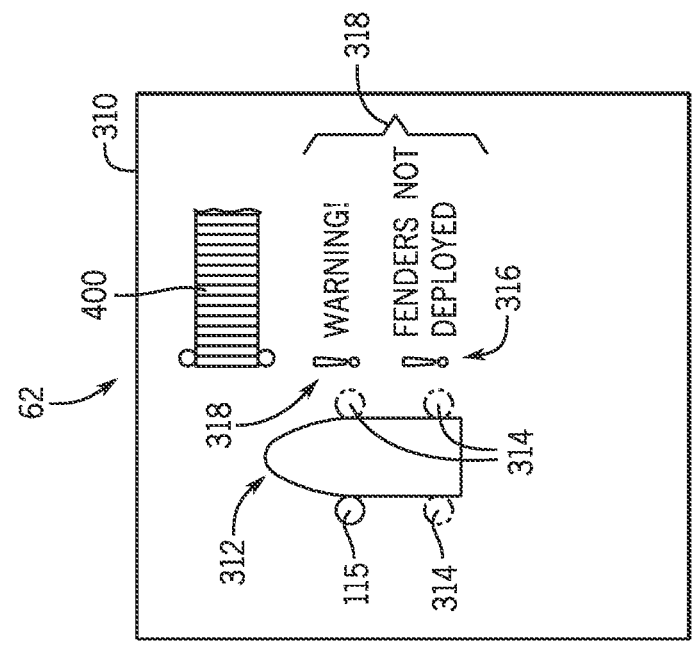
FIG. 10 is a view of a user interface of the marine vessel.

Referring to FIGS. 3 and 10-11, the system 10 is configured to determine the utilization of the deployable accessory based on whether the sensor detects that the accessory 115, 117 is coupled to the accessory holder 140, 240. The sensors associated with the variety of accessory holders operate as one of the input devices 99 and communicate with the central control module 40. The central control module 40 runs executable programs 122 and in turn initiate commands to the output devices 101, including the speakers 72, display device 62, and/or the wireless device 300 to generate a display or otherwise indicate the utilization determined for the accessory. The notification may be visual, audible, or haptic feedback to the user indicating the state of the marine accessories. The system 10 may also or alternatively provide commands to the output devices 101 (e.g., a PCM 42) and/or the user (e.g., via the speakers 72, the display device 62, or the wireless device 300).

FIG. 10 shows one example by which the system 10 may notify the user not only of the state of accessories, but also of what actions the user should take to protect the marine vessel. In particular, FIG. 10 shows a display 310 of the display device 62 with a graphic representation of the marine vessel 312 and the different positions in which accessories may be deployed via accessory holders, in this display 310 specifically fenders 115. The display 310 particularly shows which of the accessory holders are used versus unused, specifically by showing a fender 115 or an empty position 314 where a fender could be coupled to a corresponding accessory holder. In this manner, a user can quickly see whether any accessories are in use and where. This may be particularly helpful for larger marine vessels in which the accessories may be relatively far from the user or blocked from view.

In certain embodiments, when the marine vessel approaches an object such as a dock 400, the control system 100 causes the display device 62 to display warning icons 316 near the empty positions 314 that should not be empty, or in other words in positions that should have a fender 115 to prevent damage. In other circumstances, such as the marine vessel being underway, the warning icons 316 may instead appear next to fenders 115 that are deployed (rather than next to the empty positions 314), since in this case the fenders 115 should be stowed. Warning labels 318 may also be provided next to the warning icons 316 for further guidance to the user. Audible and/or haptic notifications may also be provided, which may also include instructions for the user to "PLEASE DEPLOY PORT SIDE FENDERS BEFORE DOCKING," for example.

FIG. 11 shows another display 320 according to the present disclosure. In this example, the display 320 again notifies the user of the use of an accessory, which in this case provides further guidance for stowing rather than deploying. In this case, if one or more poles 119 of a sun canopy 117 are detected to be attached to an accessory holder (or otherwise deployed), and the marine vessel is determined to be underway (e.g., moving faster than a preset velocity such as 5 mph), the control system 100 causes the display device 62 to notify the user of this accessory being in use. In particular, the display 320 shows the marine vessel 312 with a representation of the sun canopy 322 deployed. In certain embodiments, warning labels 318 and/or warning icons 316 are provided for further guidance to the user.

In this manner, the presently disclosed systems and methods assist a user by notifying them of whether an accessory is or is not in use, and in certain embodiments also provide guidance for taking correction actions.

The present disclosure also contemplates embodiments in which actions are automatically taken based on the determination of whether accessories are or are not in use. Additional detail regarding this functionality is provided below.

As discussed above, the system 10 operates within the control system 100 and provides communication between the sensors and peripheral systems, such as the display device 62, a vision system 53 and a speed control system primarily including the propulsion control modules 42 and the GPS/speed sensor 50. The systems and methods presently disclosed may be used to provide further improvement to known marine vessel operations, such as improving autonomous docking functionality or automatic speed control, based upon the utilization of fenders 115, the sun canopy 117, and other accessories.

Auto-docking systems and automatic speed control systems are generally known in the art and are thus not described in detail herein. Additional information is also provided in the patents incorporated by reference in the BACKGROUND section. In brief, the vision system 53 described above may provide much of the necessary input data for operation of an auto-docking system. The vision system 53 may comprise proximity sensors 54 (also referred to in some embodiments as image sensors) capture data relating to objects and/or the environment on or around the marine vessel 1. Examples of sensors include radars, sonars, LiDAR devices, cameras and/or stereo-vision cameras, lasers, and/or Doppler direction finders. The data from the sensors is provided as an input to one or more processors that process the data to that generate an image, make comparisons with previously generated images stored in memory, identify patterns in the data or images, and/or detect objects within the data or images. In certain examples, the image processors, or the control system 100 more generally, incorporates edge detection technology, computer vision machine learning (CVML), and/or an artificial neural network trained to detect patterns or predefined objects. A library of images pre-classified as corresponding to particular objects (e.g., a dock, other boats, etc.) may be used for training a model. This model is then used by the process for identifying the objects within new data as it is collected from the sensors going forward.

Using these techniques known in the art, the vision system 53 is configured to identify external objects such as a dock 400, as well as to output proximity measurements to the control system 100. Based upon the proximity measurements, the control system 100 is configured to output commands to the output devices 101, such as commanding the display device 62 to generate a display indicating that an external object or dock 400 has been identified. In certain embodiments, the control system 100 may be configured to provide certain automatic propulsion control functionality, or autonomous modes, by utilizing the vision system 53 in conjunction with the propulsion control modules 42. In such embodiments, the control system 100 automatically controls propulsion based on proximity measurements by the proximity sensors 54, such as to autonomously navigate the marine vessel 1 during docking (i.e., autonomous docking) and launch (i.e., autonomous launch) maneuvers with respect to the dock 400. In certain embodiments, the control system 100 is configured to detect the distance between the marine vessel 1 and an external object using the proximity sensors 54 and automatically control propulsion based on the proximity measurements by the proximity sensors 54. Additional information regarding exemplary autonomous docking functionality is provided in pending U.S. application Ser. No. 18/358,630, which is incorporated by reference herein.

With reference to FIGS. 1 and 2, in one embodiment the system 10 includes a port fender holder 140 and a starboard fender holder 140 positioned on the port side 6 and the starboard side 8 of the vessel 1, respectively. The port fender holder 140 includes a port sensor 170 and the starboard fender holder 140 includes a starboard sensor 170. The system 10 determines the utilization of the fender holders 140 by determining if the fender holders 140 are in an open or closed state based upon the output of the respective sensors 170, as discussed above. The control system 100 is configured to command the display device 62 to indicate the utilization state of the fender holder 140.

In an alternative embodiment, the control system 100 is further configured to determine on which of the port side 6 and the starboard side 8 that an external object such as the dock 400 or an obstruction are present and command the display device 62 to generate a display to indicate the utilization state of the fender holder 140 on the side of the vessel 1 where the external object is located.

Figure 12:
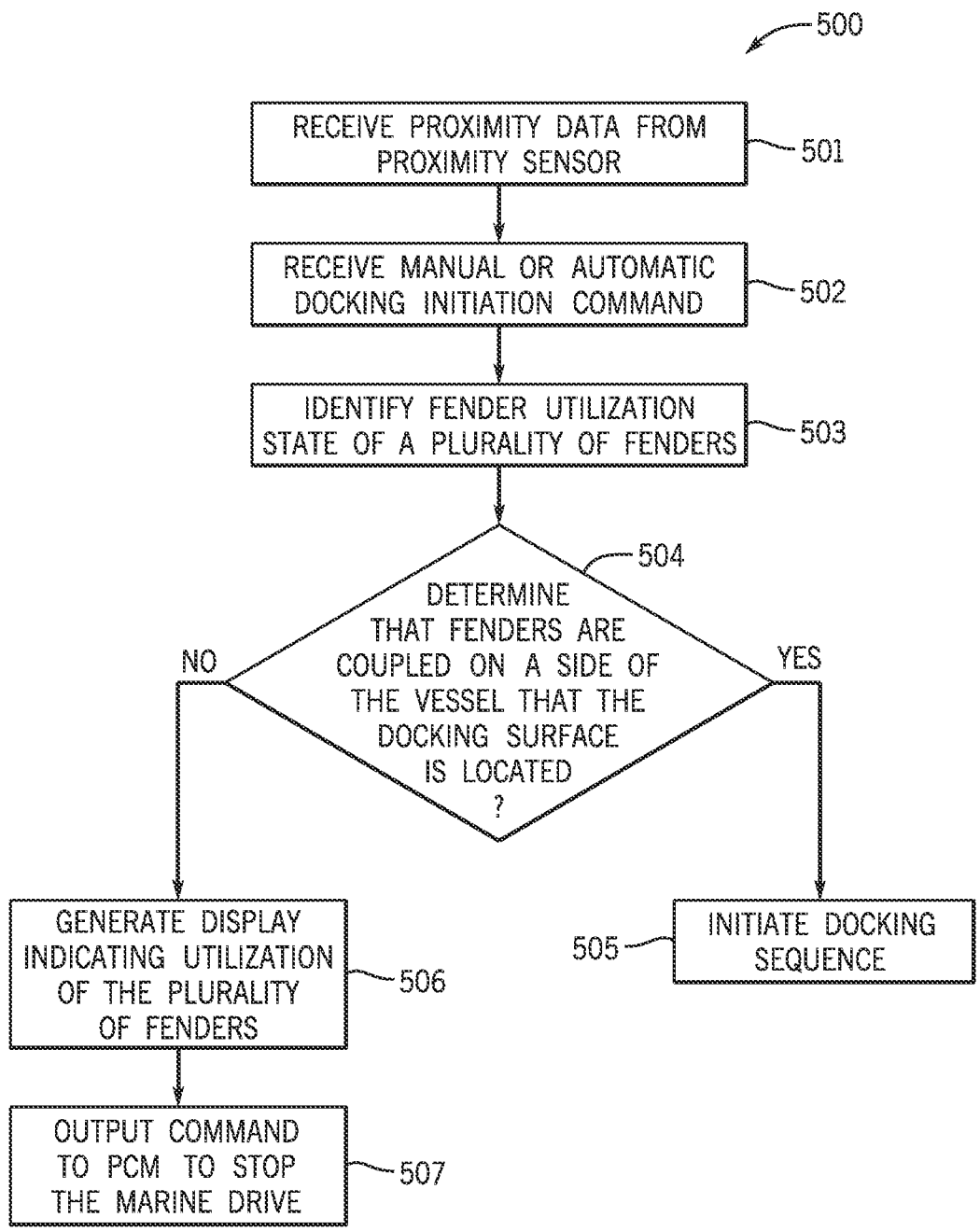
FIG. 12 is a flowchart of a method for controlling autodocking according to the present disclosure.

In certain embodiments, shown in FIG. 12, the control system 100 is configured to perform a method 500 to automatically dock the marine vessel 1, for example upon receiving a request to automatically dock the marine vessel 1 via the display device 62. Systems and methods for automatically docking marine vessels are generally known in the art, including those described in the BACKGROUND section above. Therefore, the basic controls for automatically docking are not described further herein. However, the present disclosure improves upon these basic controls using the accessory utilization concepts described herein. At step 501, the control system 100 receives proximity data from the proximity sensors 54, such as in a manner known in the art. The control system 100 then receives a request to automatically dock the marine vessel 1 at step 502. At step 503, the control system 100 identifies the utilization state of the fenders 115 in a manner described in the present disclosure. By way of example, this may be determining the utilization of a fender. The control system 100 is further configured to generate the display indicating the utilization of the fender 115 at step 506. In certain embodiments, this display is generated when the request to automatically dock the marine vessel 1 is received, and in further embodiments only if the sensor 170 detects that the fender 115 is not coupled to the fender holder 140 at step 504. In this manner, the system notifies or warns the user that although a fender should be deployed due to the imminent docking procedure, the system has detected that the fender has not been deployed, thereby helping to prevent damage to the marine vessel 1. In some instances, at step 507, the system 100 is further configured to stop the autodocking process (e.g., to stop propulsion by the marine drives 20) when the fenders 115 are not coupled and a docking sequence is requested. In certain examples, the autodocking process is stopped once the proximity sensors 54 detect that the marine vessel is within a certain distance of the dock. Additional messages and/or warnings may accompany the stopping of the autodocking process to keep the user informed, such as written text on the display devices, alarms, and/or audible messages.

The control system 100 may further be configured to selectively automatically dock the marine vessel 1 on one of the port side 6 and the starboard side 8, or to recognize on which side the user is being manually docked (e.g., using the proximity sensors and/or GPS maps). In this case, the control system 100 may generate a display to the display device 62 to indicate if a fender 115 is not coupled particularly on the side of the vessel 1 that the vessel 1 is being docked (recognizing which of the fenders are truly needed). Specifically, the control system 100 is configured to generate the display to indicate that the fender 115 is not coupled to the starboard fender holder 140 when the marine vessel 1 is automatically docking the marine vessel 1 on the starboard side 8 and the starboard sensor 170 detects that the fender 115 is not coupled to the starboard fender holder 140, and vice versa, so as to prevent damage to the marine vessel 1. In this manner, notifications are not unnecessarily provided for the side of the marine vessel that does not require fenders.

In certain embodiments, the control system 100 is further configured to detect a distance X between the marine vessel 1 and an external object (e.g., the dock 400), which may be compared to a threshold stored in memory. If the distance X is less than the threshold, the control system 100 is configured to determine the utilization state of the fender 115 on the side of the external object. If the respective fender 115 is uncoupled, the control system 100 commands the display device 62 to generate a display to indicate the fender 115 is uncoupled. It should be recognized that multiple thresholds may be used, which may have differing responses by the system. For example, the system 10 may display the utilization of the fenders at all times, add a flashing warning icon when within first threshold distance to an object (50 feet), and add an audible alarm when within a closer second threshold distance to the object (10 feet).

In further embodiments, the control system 100 is configured to stop the docking process (whether automatic or manual) at a certain distance from the dock 400 if the appropriate fenders are determined to not be deployed, thereby ensuring that damage does not occur. This may occur by overriding the signals provided to the propulsion control module, for example. In certain embodiments, the system may initiate station-keeping or position holding control strategies until the fenders are detected to be deployed on the correct side, at which point docking may continue. By way of example, this position holding could be controlled in the or similar manner as the "Skyhook" mode offered for certain marine vessels by the Brunswick Corporation of Mettawa, IL. Additional information regarding Skyhook is provided in U.S. Pat. No. 10,000,268, which is incorporated by reference in its entirety herein.

Another example of a conventionally known marine function that may be improved by the systems and methods disclosed herein is automatically controlling the speed of the marine vessel. Automatic speed control methods are known in the art, whereby a controller monitors the actual speed of the marine vessel, compares to a preset or desired speed, and adjust the propulsion such that the actual speed matches the preset or desired speed (and/or such that the actual speed remains constant). This may also be referred to as "cruise control". Since automatic speed control methods are known, further discussion is not provided herein. Additional information is also provided in the patents incorporated by reference in the BACKGROUND section.

Figure 13:
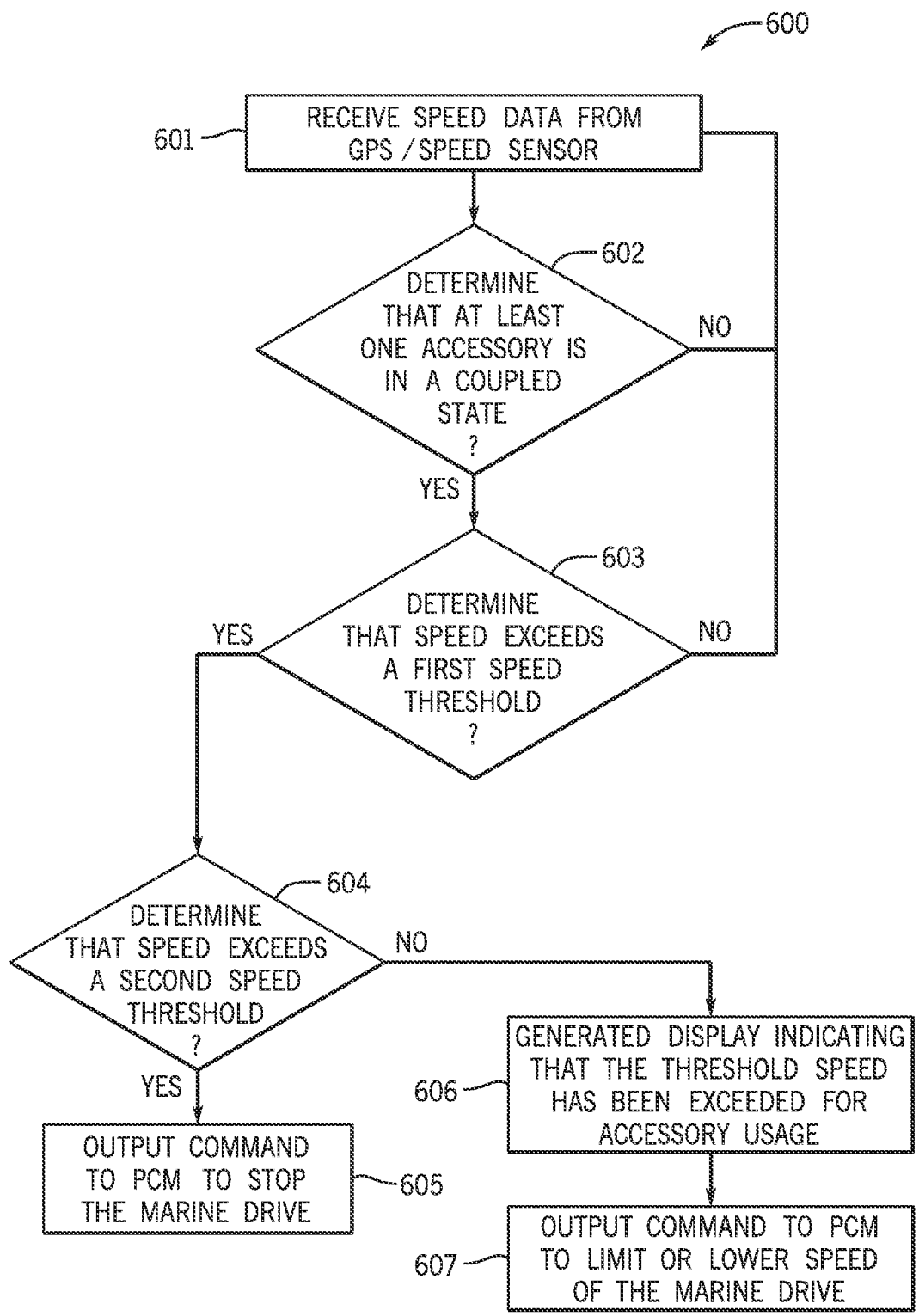
FIG. 13 is a flowchart of a method for speed control according to the present disclosure.

The systems and methods presently disclosed may be incorporated to improve on known methods for automatically controlling the speed of a marine vessel, and/or providing notifications to the user, based on the speed and the utilization of accessories. Referring to FIG. 13, the control system 100 is configured to perform a method 600 that improves upon speed control methods known in the art by incorporating the accessory utilization concepts disclosed herein. Step 601 utilizes the GPS/speed sensor 50 to measure the speed of the vessel, which may be performed in a conventional manner. The accessory utilization state is determined at step 602. In certain embodiments, threshold speed values are stored within the memory system 120 (e.g., 5 mph, 10 mph, etc.). It should be recognized that a marine drive RPM, a throttle position, or other measures may also or alternatively be used to indicate speed. The control system 100 is configured to determine if the speed provided by the GPS/speed sensor 50 (or other sensors for other measures) is at or above the stored the threshold speed values at steps 603, 604 and output a command to the output devices 101.

The output command for example, may be for the display device 62 to generate a display and/or provide other notifications indicating that a threshold speed has been met or exceeded for the current accessory usage, shown in step 606. As discussed above, this prevents loss or damage to the accessories, such as fenders or a sun canopy being ripped off at high speeds. In certain embodiments, the control system 100 may output a command to the propulsion control module 42 causing the marine drive 20 to limit or lower the speed of the marine drive 20 at step 607, or stop the marine drive 20 entirely at step 605. The control system 100 may further be configured to change the notification of the utilization of the accessories 115, 117 based upon the speed of the vessel 1, adding or changing warnings and audible alarms as different speed thresholds are crossed.

In one embodiment, the speed control system includes a first speed threshold (e.g., 5 mph) and a second speed threshold (e.g., 10 mph) that is higher than the first speed threshold. The control system 100 may be configured to output a first command if the speed provided by the GPS/speed sensor 50 is greater than that of the first speed threshold and to output a different, second command if the speed provided is greater than that of the second speed threshold. For an example of a sun canopy 117 being determined to be in use, the control system 100 may be configured to command the display device 62 to generate a warning display, as shown in FIG. 11, indicating that the sun canopy 117 is attached and should be stowed upon exceeding the first speed threshold. The control system 100 may further be configured to command the propulsion command module 42 to limit the speed of the marine vessel 1 and to notify the user to stow the accessory upon exceeding the second speed threshold.

In another embodiment, wind speed sensors are provided for the marine vessel in communication with the control system 100. If the wind speed exceeds a certain threshold (e.g., 10 mph), a notification may be made to inform the user to stow the sun canopy or other accessories. The wind speed may also be combined with the vessel speed to base thresholds on an effective wind speed as observed by the accessory (e.g., 5 mph of vessel speed+5 mph of headwinds=10 mph effective wind speed). The wind speed may also be used in embodiments in which the speed of the marine vessel is limited when the accessory is in use (e.g., subtracting the wind speed from the otherwise maximum allowable speed for operating the marine vessel while the sun canopy is deployed). The wind speed could be obtained by a conventional fan blade-based wind sensor on the marine vessel, from weather station data, or from a vision system (e.g., based on the positions or movement of windsocks or flags as compared to values in a look-up table or assessed via machine learning models). Any device that allows for determining wind speed may also be referred to simply as a wind speed sensor.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention, including the best mode, and also to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

What is claimed is:

1. A system for determining utilization of an accessory separable from a marine vessel, the system comprising:
   an accessory holder coupled to the marine vessel and configured to support and removably couple the accessory to the marine vessel;
   a sensor configured to detect whether the accessory is coupled to the accessory holder;
   a display device configured to generate a display; and
   a control system operatively coupled to the sensor and the display device, wherein the control system is configured to cause the display device to generate the display to indicate when the accessory holder is determined to be uncoupled from the accessory.

2. The system according to claim 1, wherein the control device is configured to determine that the accessory is used when the accessory is detected to be coupled to the accessory holder.

3. The system according to claim 1, wherein the accessory is a fender for protecting the marine vessel and the accessory holder is a fender holder configured for attaching the fender thereto.

4. The system according to claim 3, wherein the fender is one of multiple fenders for protecting the marine vessel and the fender holder is one of multiple fender holders coupled to the marine vessel and configured to support multiple fenders, respectively, and wherein the display device is configured to display the utilization of the multiple fenders separately from each other.

5. The system according to claim 4, wherein the display by the display device comprises a graphic depiction of the marine vessel and the utilization of each of the multiple fenders is displayed in a corresponding different location relative to the depiction of the marine vessel.

6. The system according to claim 3, wherein the sensor is a solid-state sensor that detects a presence of a line coupling the fender to the fender holder.

7. The system according to claim 1, wherein the accessory is a sun canopy assembly configured to provide shade for the marine vessel when in use, and wherein a pole of the sun canopy assembly is couplable to the marine vessel via the accessory holder.

8. The system according to claim 7, wherein the marine vessel comprises a speed sensor configured to measure a speed in which the marine vessel is moving in water, and wherein the control system is configured to cause the display device to change the display of the utilization of the sun canopy when the sun canopy is determined to be in use and the speed of the marine vessel exceeds a first threshold speed.

9. The system according to claim 7, wherein the marine vessel comprises a wind speed sensor configured to measure a wind speed, and wherein the control system is configured to cause the display device to change the display of the utilization at least in part based also upon the wind speed.

10. A system for determining utilization of an accessory for a marine vessel, the system comprising:
an accessory holder coupled to the marine vessel and configured to support the accessory, wherein the accessory holder is moveable between a closed position in which the accessory is not attachable thereto and an open position in which the accessory is attachable thereto;
a sensor configured to detect whether the accessory holder is in the closed position or the open position, wherein the accessory is detected to be coupled to the accessory holder when the accessory holder is in the open position;
a display device configured to generate a display; and
a control system operatively coupled to the sensor and the display device, wherein the control system is configured to determine the utilization of the accessory based on whether the sensor detects that the accessory is coupled to the accessory holder, and wherein the control system is configured to cause the display device to generate the display to indicate the utilization determined for the accessory.

11. The system according to claim 10, wherein the sensor is a limit switch actuated by moving the accessory holder between the open position and the closed position.

12. The system according to claim 10, wherein the accessory holder moves at least partially into a hull of the marine vessel when moving into the closed position.

13. A system for determining utilization of a fender for protecting a marine vessel, the system comprising:
an accessory holder coupled to the marine vessel and configured to support the fender;
a sensor configured to detect whether the fender is coupled to the accessory holder;
a control system operatively coupled to the sensor and configured to determine the utilization of the fender based on whether the sensor detects that the fender is coupled to the accessory holder, wherein the control system is further configured to automatically dock the marine vessel, and wherein the control system automatically docking the marine vessel is prevented when the sensor detects that the fender is not coupled to the accessory holder so as to prevent damage to the marine vessel.

14. The system according to claim 13, further comprising a display device configured to generate a display, wherein the control system is configured to to receive a request to automatically dock the marine vessel, and wherein the control system is further configured to generate the display indicating the utilization of the fender when the request to automatically dock the marine vessel is received and the sensor detects that the fender is not coupled to the accessory holder so as to prevent damage to the marine vessel.

15. The system according to claim 13, further comprising a display device configured to generate a display, wherein the accessory holder comprises a port accessory holder and a starboard accessory holder coupled on a port side and a starboard side of the marine vessel, respectively, wherein the sensor comprises a port sensor and a starboard sensor configured to detect whether the fender is coupled to the port accessory holder and the starboard accessory holder, respectively, wherein the control system is further configured to selectively automatically dock the marine vessel on one of the port side and the starboard side thereof, and wherein the control system is further configured to generate the display to indicate that the fender is unused particularly via the starboard accessory holder when the marine vessel is automatically docking the marine vessel on the starboard side and the starboard sensor detects that the fender is not coupled to the starboard accessory holder so as to prevent damage to the marine vessel.

16. A system for determining utilization of an accessory for a marine vessel, the system comprising:
an accessory holder coupled to the marine vessel and configured to support the accessory;
a first sensor configured to detect whether the accessory is coupled to the accessory holder;
a proximity sensor configured to detects a distance between the marine vessel and an external object;
a display device configured to generate a display; and
a control system operatively coupled to the first sensor, the proximity sensor, and the display device, wherein the control system is configured to determine the utilization of the accessory based on whether the first sensor detects that the accessory is coupled to the accessory holder and to cause the display device to generate the display to indicate the utilization determined for the accessory, and wherein the control system is configured to compare the distance to a threshold and to change the display generated by the display device to indicate that the accessory is unused when the sensor detects that the accessory is not coupled to the accessory holder and the distance between the marine vessel and the external object is below the threshold to thereby prevent damage to the marine vessel.

17. The system according to claim 16, wherein the accessory holder comprises a port accessory holder and a starboard accessory holder coupled on a port side and a starboard side of the marine vessel, respectively, wherein the sensor comprises a port sensor and a starboard sensor configured to detect whether the accessory is coupled to the port accessory holder and the starboard accessory holder, respectively, wherein the control system is configured to determine on which one of the port side and the starboard side the external object is located, and wherein the control system is configured to cause the display device to indicate when the accessory is unused particularly on the one of the port side and the starboard side in which the external object is located so as to prevent damage to the marine vessel.

18. A system for determining utilization of an accessory for a marine vessel, the system comprising:
- an accessory holder coupled to the marine vessel and configured to support the accessory;
- a first sensor configured to detect whether the accessory is coupled to the accessory holder;
- a speed sensor configured to measure a speed in which the marine vessel moves in water and/or a wind speed;
- a display device configured to generate a display; and
- a control system operatively coupled to the first sensor, the speed sensor, and the display device, wherein the control system is configured to determine the utilization of the accessory based on whether the first sensor detects that the accessory is coupled to the accessory holder, wherein the control system is configured to cause the display device to generate the display to indicate the utilization determined for the accessory, and wherein the control system is configured to cause the display device to change the display of the utilization based at least in part upon the speed from the speed sensor.

19. The system according to claim 18, wherein the control system is further configured such that when the accessory is determined to be in use, the control system prevents the marine vessel from operating such that the speed exceeds a threshold speed.

20. The system according to claim 18, wherein the control system is configured to change the display of the utilization when the accessory is in use and the speed of the marine vessel exceeds a speed threshold.

21. A system for detecting use of a first fender and a second fender with a marine vessel, the system comprising:
- a first fender holder moveable between a closed position that is stowed and an open position configured for supporting the first fender;
- a first switch configured to detect whether the first fender holder is in the open position;
- a second fender holder moveable between a closed position that is stowed and an open position configured for supporting the second fender;
- a second switch configured to detect whether the second fender holder is in the open position; and
- a display device configured to display the use of the first fender and the use of the second fender, wherein the first fender and the second fender are determined to be in use when the first fender holder and the second fender holder are in the open position, respectively.

* * * * *